US010087949B2

(12) United States Patent
Motomura et al.

(10) Patent No.: US 10,087,949 B2
(45) Date of Patent: Oct. 2, 2018

(54) BLOWER DEVICE AND AIR CONDITIONER HAVING THE SAME FOR VEHICLE (71) Applicant: DENSO CORPORATION, Kariya, Aichi-pref. (JP)

(72) Inventors: Hirohisa Motomura, Kariya (JP); Masashi Narita, Kariya (JP); Sukhwan Lee, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 123 days.

(21) Appl. No.: 15/101,795

(22) PCT Filed: Jan. 29, 2015

(86) PCT No.: PCT/JP2015/000382
§ 371 (c)(1),
(2) Date: Jun. 3, 2016

(87) PCT Pub. No.: WO2015/122133
PCT Pub. Date: Aug. 20, 2015

(65) Prior Publication Data
US 2016/0305446 A1 Oct. 20, 2016

(30) Foreign Application Priority Data
Feb. 14, 2014 (JP) .................. 2014-026936

(51) Int. Cl.
B60H 1/12 (2006.01)
F04D 29/42 (2006.01)
(Continued)

(52) U.S. Cl.
CPC ........... F04D 29/4226 (2013.01); B60H 1/12 (2013.01); B60H 1/3204 (2013.01);
(Continued)

(58) Field of Classification Search
CPC .... F04D 29/4226; F04D 29/281; F04D 17/08; F04D 25/0693; F04D 25/08; B60H 1/12; B60H 1/3204; B60H 1/3233
(Continued)

(56) References Cited

U.S. PATENT DOCUMENTS 4,851,725 A * 7/1989 Keck ...................... H01R 13/74
144/248.5
5,006,742 A * 4/1991 Strobl ...................... H02K 5/10
310/43
(Continued)

FOREIGN PATENT DOCUMENTS

EP 0484289 A2 * 5/1992 ........... H01R 13/521
JP H09267621 A 10/1997
(Continued)

OTHER PUBLICATIONS

International Search Report and Written Opinion (in Japanese with English Translation) for PCT/JP2015/000382, dated Apr. 28, 2015; ISA/JP.
(Continued)

Primary Examiner — Gregory Huson
Assistant Examiner — Ryan Faulkner
(74) Attorney, Agent, or Firm — Harness, Dickey & Pierce, P.L.C.

(57) ABSTRACT

A blower device includes: a motor support component fixed to a lower surface of a casing; and a connector including a connection terminal in which electric current flows disposed below the casing. The blower device further includes: a first cover wall part extending in an up-and-down direction and a circumferential direction and spaced from an external wall part of the motor support component on an outer side; a groove portion connecting the first cover wall part and the motor support component; and a cover component which
(Continued)

covers an upper side of the connector. The cover component is integrally formed with the outer side of the first cover wall part. A length of the groove portion in the circumferential direction is longer than the connector. Both ends of the groove portion are located outside of both ends of the connector in the circumferential direction.

10 Claims, 10 Drawing Sheets

(51) Int. Cl.
*F04D 25/06* (2006.01)
*B60H 1/32* (2006.01)
*F04D 17/08* (2006.01)
*F04D 25/08* (2006.01)
*F04D 29/28* (2006.01)

(52) U.S. Cl.
CPC ........... *B60H 1/3233* (2013.01); *F04D 17/08* (2013.01); *F04D 25/0693* (2013.01); *F04D 25/08* (2013.01); *F04D 29/281* (2013.01)

(58) Field of Classification Search
USPC .......................................................... 454/160
See application file for complete search history.

(56) References Cited

U.S. PATENT DOCUMENTS

| | | | |
|---|---|---|---|
| 2005/0230096 A1* | 10/2005 | Yamaoka | B60H 1/03 165/202 |
| 2012/0114512 A1* | 5/2012 | Lofy | F04D 29/4226 417/410.1 |
| 2013/0221786 A1 | 8/2013 | Truillet et al. | |

FOREIGN PATENT DOCUMENTS

| | | |
|---|---|---|
| JP | 2000345998 A | 12/2000 |
| JP | 2007154856 A | 6/2007 |
| JP | 2013531457 A | 8/2013 |

OTHER PUBLICATIONS

Journal of Technical Disclosure 2013-503450, Nov. 14, 2013.

* cited by examiner

BLOWER DEVICE AND AIR CONDITIONER HAVING THE SAME FOR VEHICLE

CROSS REFERENCE TO RELATED APPLICATIONS

This application is a U.S. National Phase Application under 35 U.S.C. 371 of International Application No. PCT/JP2015/000382 filed on Jan. 29, 2015 and published in Japanese as WO 2015/12233 A1 on Aug. 20, 2015. This application is based on and claims the benefit of priority from Japanese Patent Application No. 2014-026936 filed on Feb. 14, 2014. The entire disclosure of all of the above applications are incorporated herein by reference.

TECHNICAL FIELD

The present disclosure relates to a blower device and an air conditioner having the same for a vehicle.

BACKGROUND ART

Non patent literature 1 discloses a blower device for air-conditioning, in which water flows downward along a groove defined in a flange surface of a casing that supports a motor, to prevent the motor from receiving the water. The water guided by the groove is drained outside from the lower end part of the flange surface which forms a vertical plane.

PRIOR ART LITERATURES

Non Patent Literature

Non Patent Literature 1: Journal of technical disclosure No. 2013-503450

SUMMARY OF INVENTION

In the blower device of Non patent literature 1, moisture may be contained in air flowing through an air passage. For example, when a blower device takes in outside air, if the outside air includes rain, snow, or the like, humid air flows through the air passage, and water drop may fall inside the blower device. The dropped water may leak outside from a fitting portion of a case which forms the air passage.

The leaked water may move along a wall while flowing downward with gravity, and may reach a connector which is one of electrical parts used for supplying electric power to a motor. If the connector receives water, a short circuit may be generated between connection terminals in the connector. Although there is a concept of making the connector itself waterproof as a measure against water, the cost of the connector increases in this case.

It is an object of the present disclosure to provide a blower device in which water leaked out of an air passage can be prevented from reaching a connector which is an electric part, and an air-conditioner having the blower device for a vehicle.

The disclosed blower device includes:
a casing having an air passage in which air flows;
a fan disposed in the casing;
a motor that provides a driving force to rotate the fan;
a motor support component fixed to a lower surface of the casing to support the motor, the motor support component having
an external wall part in contact with the casing around a perimeter part,
an inner wall surface communicated to the air passage, and
an outer wall surface exposed outside;
a first cover wall part formed integrally with the motor support component, the first cover wall part extending in an axial direction and a circumferential direction to be spaced from the external wall part on an outer side;
a groove portion that integrally connects the first cover wall part and the motor support component with each other, the groove portion having a bottom surface extending in the circumferential direction and located below an upper end of the external wall part and an upper end of the first cover wall part;
a connector including a connection terminal in which electric current flows, the connector being disposed below the casing or the motor support component; and
a cover component integrally formed with an outer side of the first cover wall part to cover an upper side of the connector.

The groove portion has a length longer than that of the connector in the circumferential direction, and the groove portion has ends in the circumferential direction, and the ends of the groove portion are located outside of ends of the connector in the circumferential direction, respectively.

Accordingly, when water existing in the air passage flows downward along the inner wall surface of the motor support component due to gravity, and when the water is leaked outside through various crevices such as a fitting portion between the motor support component and the casing, the leaked water can be restricted from reaching the connector as a waterproofing structure. The water leaked out of the casing moves along the external wall part of the motor support component, and flows through the groove portion located lower than the upper end of the external wall part. That is, the water moving along the external wall part of the motor support component cannot be directly transmitted from the external wall part to the first cover wall part, since the first cover wall part stands to be spaced from the motor support component.

The water which fell onto the groove portion cannot move over the upper end of the first cover wall part located at the position higher than the groove portion, and falls after reaching one of the ends of the groove portion or the first cover wall part in the circumferential direction. The water is not poured on the connector, since the both ends of the groove portion and the first cover wall part in the circumferential direction are located outside of the both ends of the connector in the circumferential direction. As mentioned above, the water leaked outside the casing is flows through a course not in contact with the connector, finally. Thus, the connection terminal inside the connector can be prevented from being wet. Therefore, according to the present disclosure, a blower device can be provided in which water leaked from an air passage can be prevent from reaching the connector which is an electric part.

DESCRIPTION OF EMBODIMENTS

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

Figure 1:
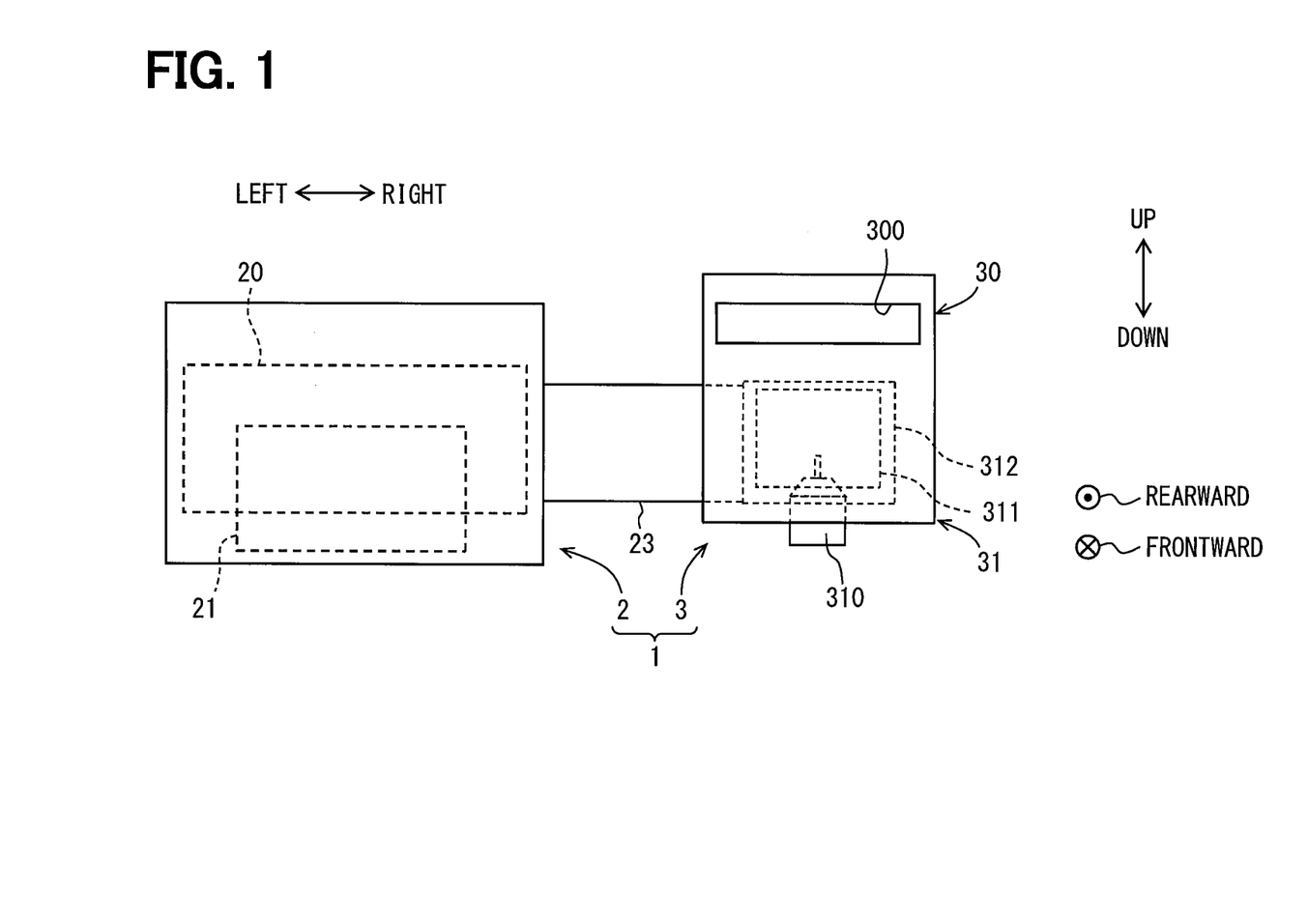
FIG. 1 is a schematic view illustrating an air-conditioner for a vehicle equipped with a blower device according to a first embodiment.

A blower device to which the present disclosure is applied is explained with reference to FIG. 1-FIG. 9. FIG. 1 is a schematic view for explaining an air-conditioner 1 for a vehicle, according to a first embodiment, equipped with the blower device to which the present disclosure is applied. In FIG. 1, the upper side represents an upper side in the vehicle, the lower side represents a lower side in the vehicle, the left side represents a left side in the vehicle, the right side represents a right side in the vehicle, the direction going to the front represents a rearward in the vehicle, and the direction going behind represents a frontward in the vehicle. A ventilation unit 3 which is an example of the blower device to which the present disclosure is applied can be solely used as one product, and can also be used as a part of one product by combining with the other equipment. In the first embodiment, the ventilation unit 3 is used as a part of the air-conditioner 1.

As shown in FIG. 1, the air-conditioner 1 includes, for example, an air-conditioning unit 2 which performs temperature control of air sent from the ventilation unit 3, and a duct part 23 which defines an air passage connecting the ventilation unit 3 and the air-conditioning unit 2, in addition to the ventilation unit 3. Each of the air-conditioning unit 2, the ventilation unit 3, and the duct part 23 is made of a product molded with, for example, polypropylene (PP resin). When improving the strength, PP resin containing talc and glass fiber of a predetermined quantity may be used.

The ventilation unit 3 is arranged offset from the central part toward a front passenger seat in a space behind the instrument panel in the passenger compartment. The air-conditioning unit 2 is arranged at approximately central part in the width direction of the vehicle, in the space behind the instrument panel. Since the space is communicated with the passenger compartment where an occupant exists, air in the space is communicated to air in the passenger compartment.

The air-conditioning unit 2 includes an evaporator 20, a heater core 21, and an air mixing door in a common case as air-conditioning functional components for conditioning air to be sent into the passenger compartment. The evaporator 20 is thin in the front-and-rear direction of the vehicle, and is arranged to cross a passage within the case. Therefore, blast air from the ventilation unit 3 flows into the front surface of the evaporator 20 extending in the up-and-down direction and the right-and-left direction of the vehicle. The evaporator 20 cools air by absorbing the evaporation latent heat of refrigerant in a refrigerating cycle.

The heater core 21 is arranged downstream of the evaporator 20 in the flow of air, that is on the rear side in the vehicle, with a predetermined interval. The heater core 21 heats air cooled by passing through the evaporator 20. Hot water (for example, engine cooling water) flows inside the heater core 21, and air is heated by the hot water as a heat source.

A bypass channel for the cooled air is formed on the upper side of the heater core 21 within the case. The cooled air bypasses the heater core 21 by flowing through the bypass channel. The air mixing door is disposed between the heater core 21 and the evaporator 20 within the case, and controls the ratio of the warm air heated with the heater core 21 and the cooled air which bypasses the heater core 21 through the bypass channel.

The air mixing door adjusts the ratio of the amount of the warm air which passes through the heater core 21 to the amount of the cooled air which does not pass through the heater core 21 by changing the position of the air mixing door. The air mixing door controls the temperature of the conditioned air by adjusting the ratio of the warm air to the cooled air according to the opening degree of the air mixing door. Moreover, an air mix chamber is defined in the case, where the cooled air flowing from the evaporator 20 and the warm air heated with the heater core 21 are mixed. The temperature of conditioned air is controlled in this space, and the conditioned air can be supplied to the passenger compartment with a proper ratio by controlling each door which opens and closes each blow-off port connected to the passenger compartment.

Figure 2:
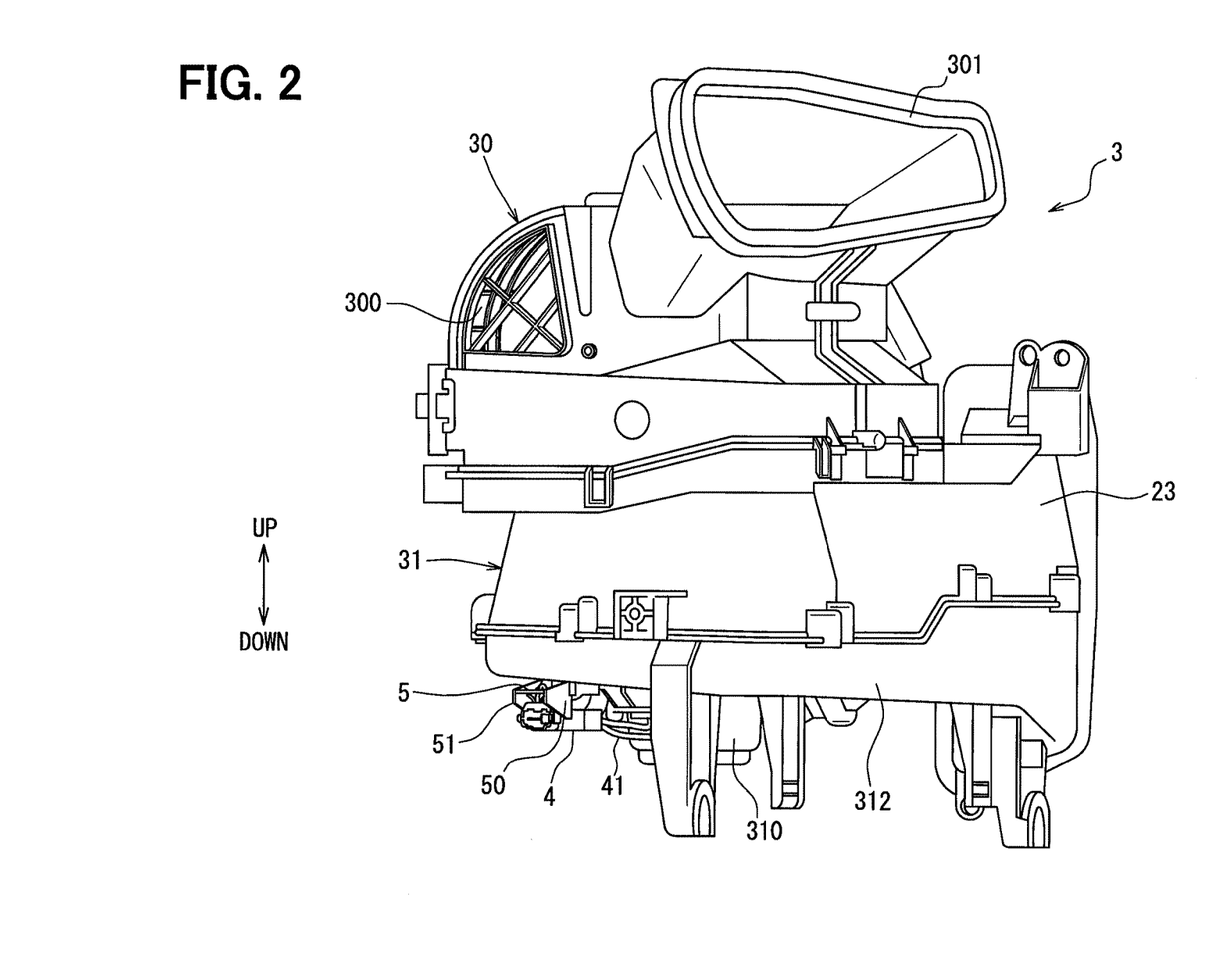
FIG. 2 is a whole view illustrating a ventilation unit of the first embodiment.
Figure 3:
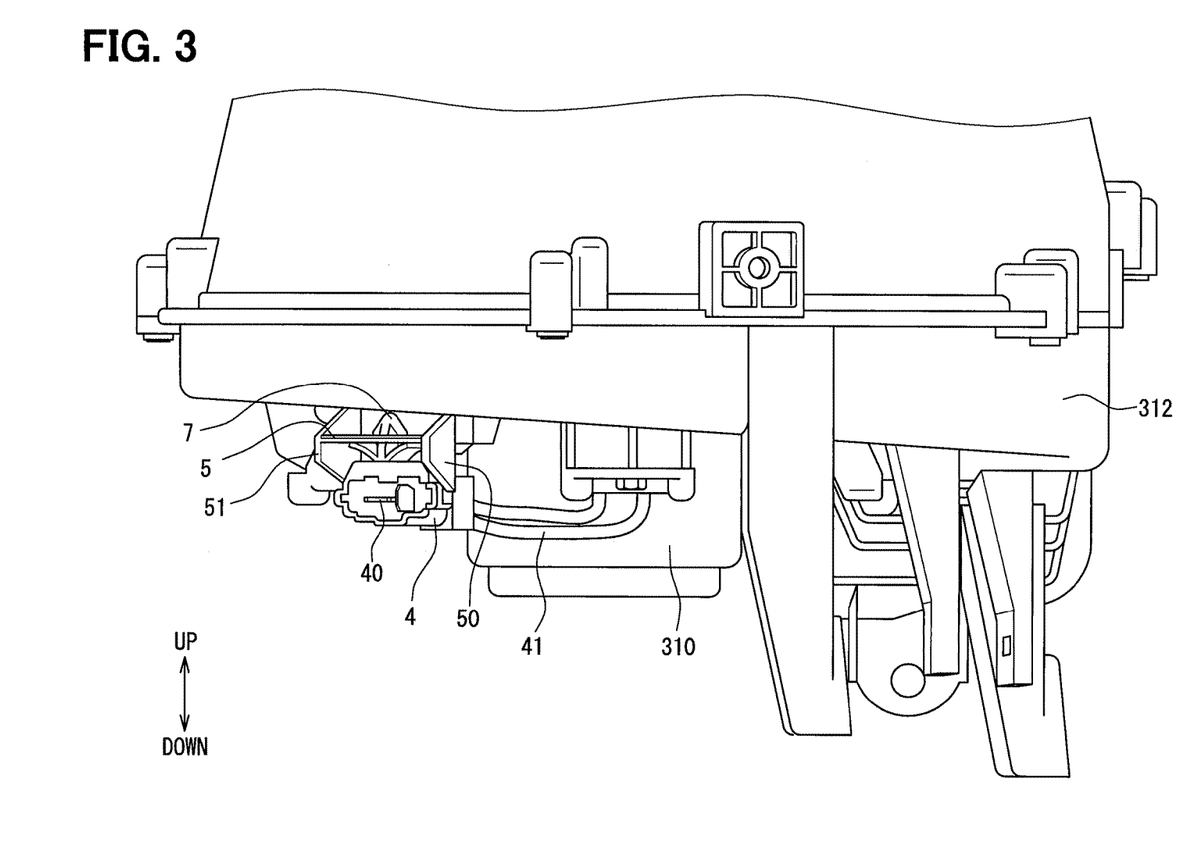
FIG. 3 is a partially enlarged view illustrating a lower part of the ventilation unit of the first embodiment.
Figure 4:
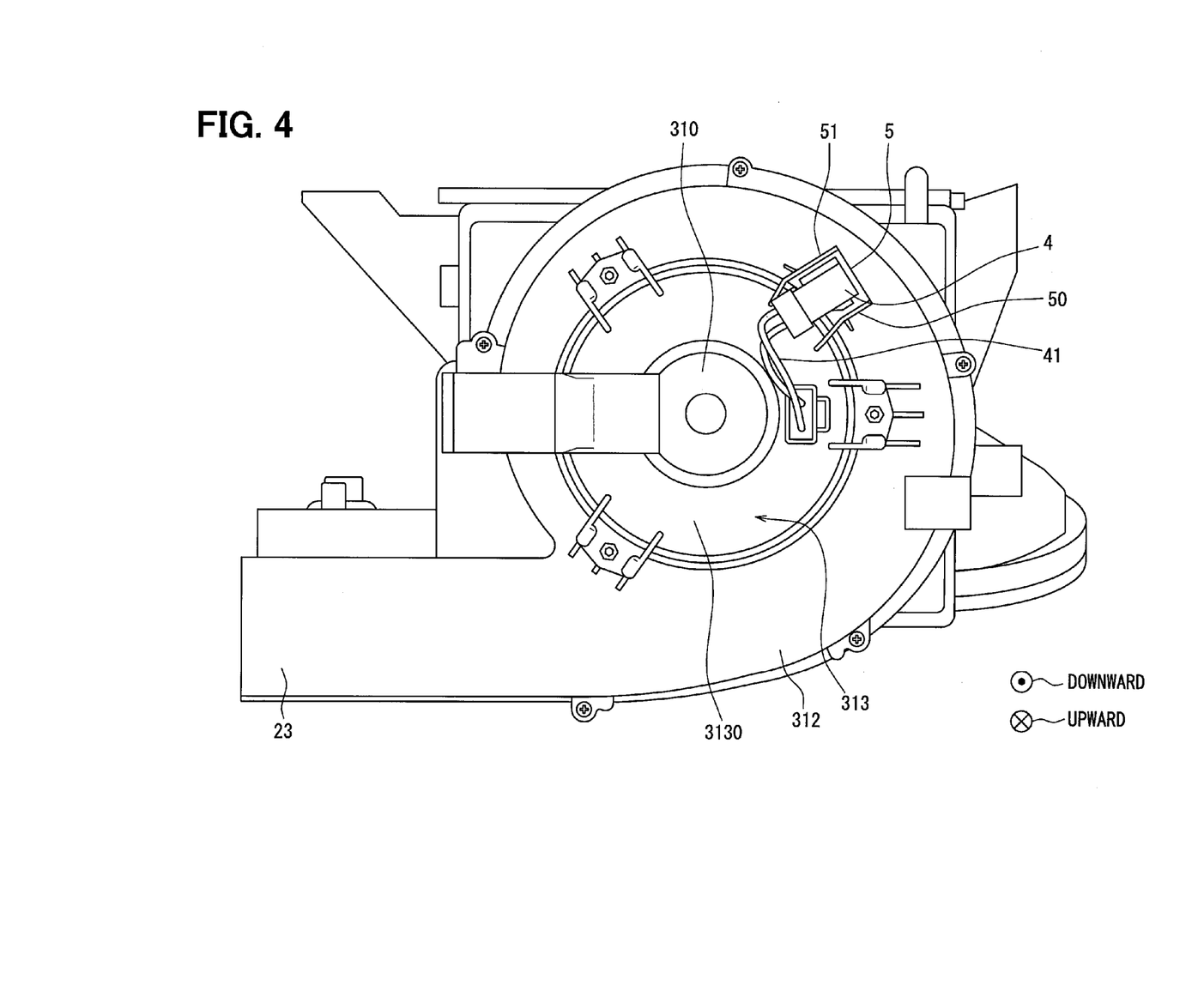
FIG. 4 is a bottom view of the ventilation unit of the first embodiment.
Figure 5:
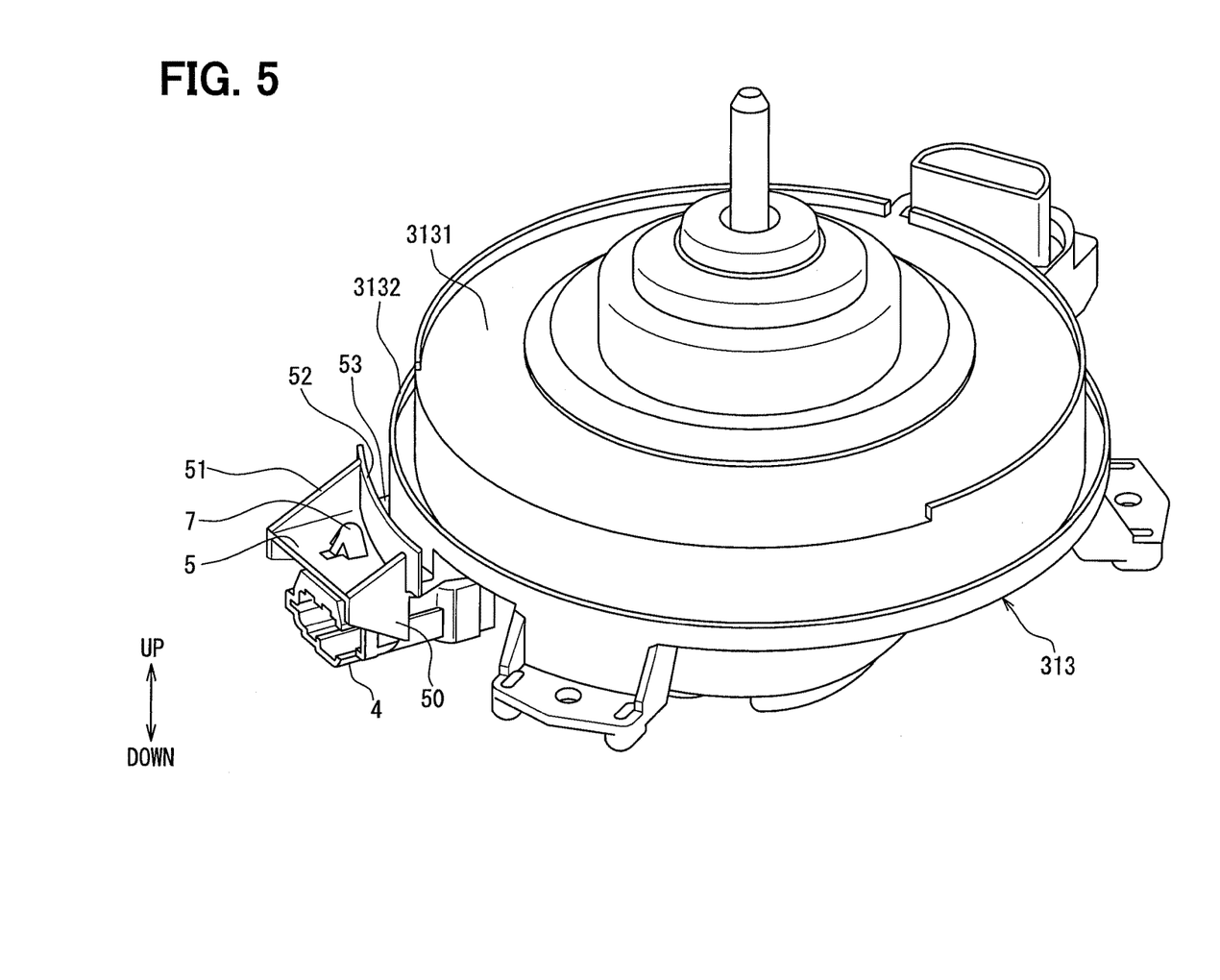
FIG. 5 is a perspective diagram showing a motor holder and a waterproofing structure in the ventilation unit of the first embodiment.

FIG. 2-FIG. 4 show the ventilation unit 3 of the first embodiment from different orientations. The ventilation unit 3 includes: a casing 312 having an air passage through which air flows; a fan 311 disposed in the casing 312; a motor 310 which provides a driving force to rotate the fan 311; and a motor support component 313 which supports the motor 310.

The ventilation unit 3 further has: an air intake equipment 30 which takes in at least one of inside air in the passenger compartment and outside air outside of the passenger compartment; and a filter which catches dust when at least one of the outside air and the inside air passes. The fan 311 draws inside air or outside air through an inside air intake port 300 and an outside air intake port 301 defined in the air intake equipment 30. The air intake ports are opened and closed by one or plural air intake doors according to an air intake mode. The outside air intake port 301 communicates with outside, for example, under a vehicle cowl, through a duct. The inside air intake port 300 is communicated to the passenger compartment at a space under an instrument panel through a duct.

The fan 311 is, for example, a centrifugal multiblade fan having plural blades arranged annularly around the perimeter. The fan 311 is arranged inside a spiral casing 312, and draws air downward and blows off the air in the centrifugal direction. The upper surface of the casing 312 has a suction opening for the fan 311. The spiral passage formed in the casing 312 is connected to the duct part 23 from a predetermined part around the fan 311. The suction opening of the casing 312, an inner wall surface 3131, and an outer wall surface 3130 are parallel or almost parallel to the ground, in a usual state mounted to the vehicle.

The motor 310 is disposed so that a part of the motor 310 is exposed downward from the outer wall surface 3130 of the motor support component 313. The motor 310 is supported by the motor support component 313 in the state where the driving shaft extends upward. A boss part which corresponds to the rotation shaft of the fan 311 is fixed to the driving shaft of the motor 310. The motor support component 313 is a component fixed to the lower surface of the casing 312, and the motor 310 is fixed at the center of the motor support component 313. The motor support component 313 has an external wall part 3132 around the perimeter part, and the external wall part 3132 is in contact with the casing 312. The motor support component 313 is fixed to the casing 312 in the state where the inner wall surface 3131 communicated to the air passage faces upward and where the outer wall surface 3130 exposed outside faces downward.

For example, an undercover under an instrument panel is located under the lower part of the motor 310 exposed to the space behind the instrument panel. The undercover is arranged to cover a part of the exposed motor 310 from a foot of an occupant.

The external wall part 3132 of the motor support component 313 forms an annular wall surrounding the circumference of the inner wall surface 3131. The upper end of the external wall part 3132 is located below the inner wall surface 3131, and the outer diameter of the external wall part 3132 is larger than the outer diameter of the inner wall surface 3131. An annular groove portion 3133 is formed on the inner side of the external wall part 3132, and has the bottom surface located lower than the upper end of the external wall part 3132. When the motor support component 313 is fixed to the lower surface of the casing 312, the external wall part 3132 and the annular groove portion 3133 are fitted into the opening formed in the lower surface of the casing 312. Therefore, the external wall part 3132 and the annular groove portion 3133 constitute a fitting portion and a wearing portion with respect to the opening of the casing 312.

A part of the motor 310 and the driving shaft of the motor 310 are projected upward than the inner wall surface 3131, and are located in the air passage inside the casing 312. Therefore, moisture contained in the air in the air passage, rain or snow taken into the air passage, or the like may fall on the inner wall surface 3131. The water fell in this way stays on the inner wall surface 3131. When the amount of water becomes larger than a certain quantity, or when the ventilation unit 3, i.e., the inner wall surface 3131, is inclined relative to the horizontal plane, the water flows to the perimeter side and reaches the annular groove portion 3133 and the external wall part 3132.

Figure 9:
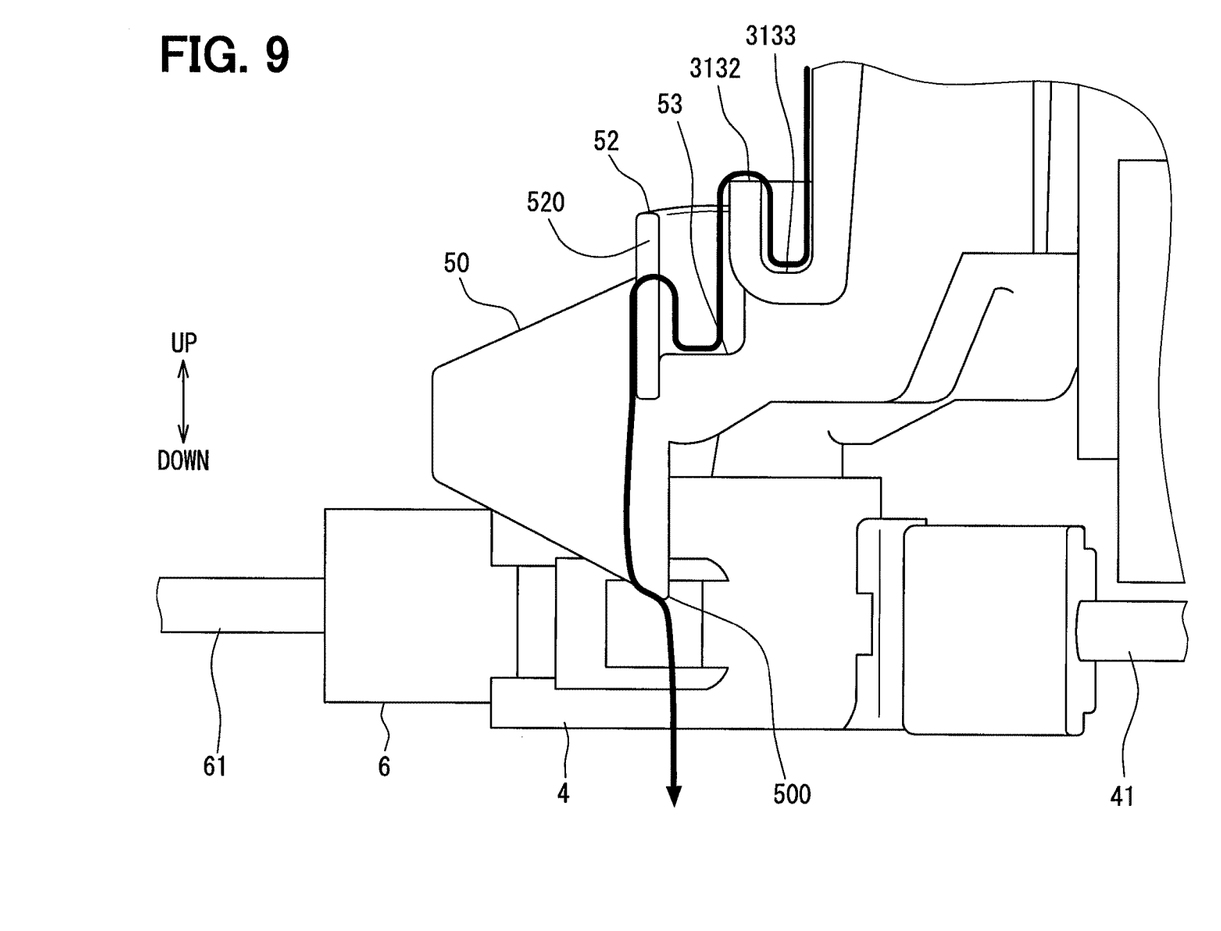
FIG. 9 is an enlarged side view illustrating the waterproofing structure in the ventilation unit of the first embodiment.

The ventilation unit 3 includes a connector 4 located below the casing 312 or the motor support component 313, and the connector 4 includes a connection terminal 40 in which electric current flows. A cable 41 prolonged from the connector 4 is connected to a voltage input unit of the motor 310. Therefore, as shown in FIG. 9, the female connector 4 is engaged with a male connector 6 to which a cable 61 is connected to supply electric power from a power source. When the female connector 4 and the male connector 6 are connected with each other, the internal connection terminals are connected so that the energizing is possible, and the electric power from the power source is inputted into the motor 310.

When the ventilation unit 3 takes in, for example, outside air, rain, snow, etc. are taken into with the outside air, and humid air flows through the air passage. Water may fall on the inner wall surface 3131 of the motor support component 313. The water may leak outside from a fitting portion between the motor support component 313 and the casing 312. The leaked water easily flows downward due to gravity, and flows along a wall. The water may reach the connector 4 which is one of electric parts used for supplying electric power to a motor. When the connector 4 receives water, there is a possibility that the connection terminal 40 in the energized state inside the connector 4 may result in a short circuit state due to the water. Then, the ventilation unit 3 is equipped with the waterproofing structure to be explained below in order to solve such fault.

Figure 6:
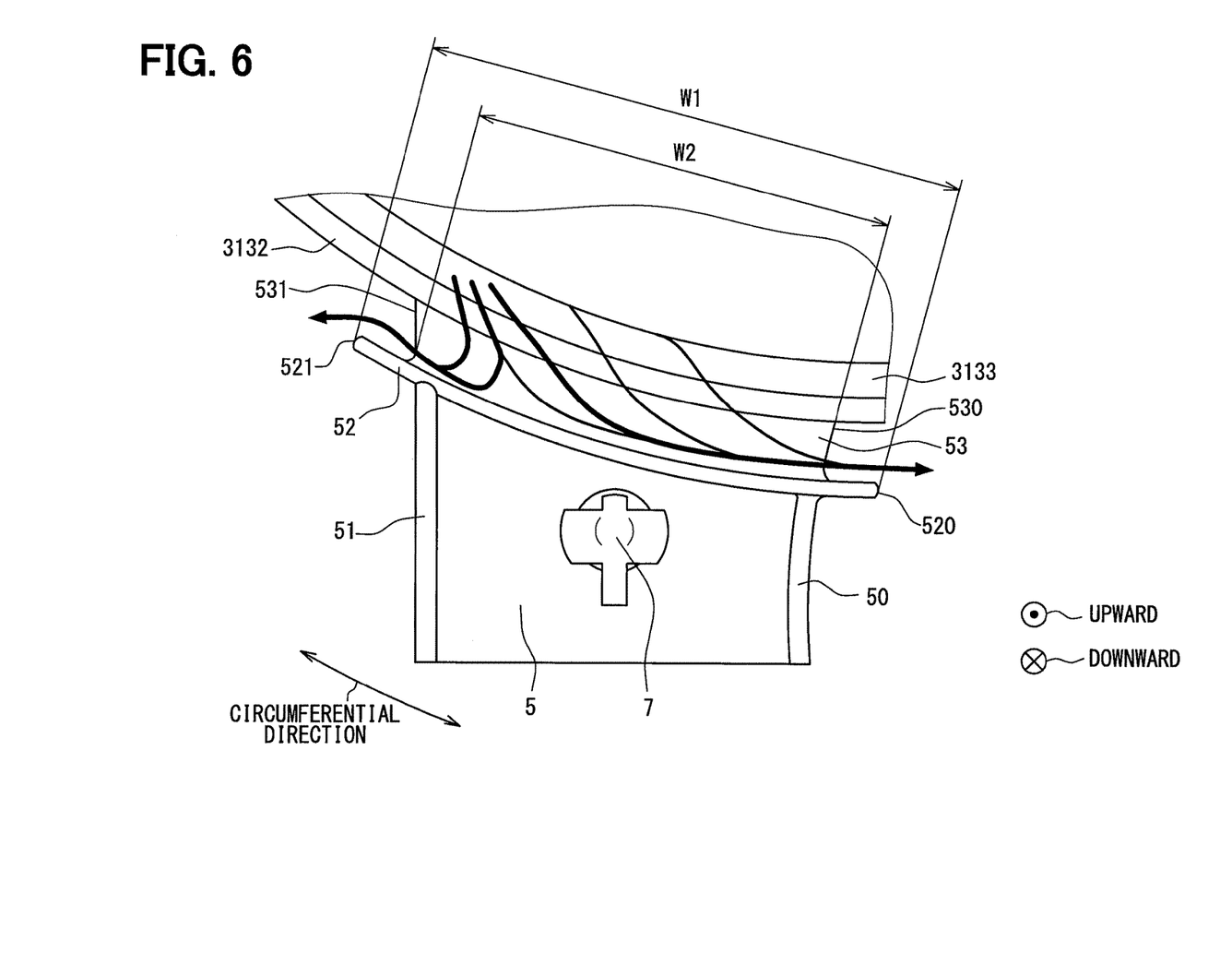
FIG. 6 is an enlarged top view illustrating the waterproofing structure in the ventilation unit of the first embodiment.

As shown in FIG. 5-FIG. 9, the ventilation unit 3 has a first cover wall part 52 standing to extend in the up-and-down direction (axial direction) and the circumferential direction and to be spaced from the external wall part 3132 on the outer side in the radial direction. The first cover wall part 52 is formed integrally with the motor support component 313 through a connection portion connected with the motor support component 313. The first cover wall part 52 is a tabular wall part which covers the external wall part 3132 on the outer side in the radial direction, at a predetermined position. As the external wall part 3132 has a ring shape, the first cover wall part 52 also has a curved form along the form of the external wall part 3132. Therefore, as shown in FIG. 6, in the plane view, the first cover wall part 52 has the shape corresponding to the shape of the external wall part 3132 in the circumferential direction.

The ventilation unit 3 has a groove portion 53 located below the upper end of the external wall part 3132 and the upper end of the first cover wall part 52. As shown in FIG. 6, the bottom surface of the groove portion 53 extends in the circumferential direction. The bottom surface of the groove portion 53 extends in the circumferential direction with the curved state along the shape of the external wall part 3132. The groove portion 53 corresponds to a connection portion which connects the first cover wall part 52 and the motor support component 313.

The ventilation unit 3 has a cover component 5 which covers the upper side of the connector 4, and the cover component 5 is formed integrally on the outer side of the first cover wall part 52 in the radial direction. The cover component 5 is a tabular portion projected outward from the first cover wall part 52 in the radial direction, and is projected to be perpendicular or mostly perpendicular to the first cover wall part 52. The cover component 5 is projected from the lower part of the first cover wall part 52, and a support component 7 is attached to a part of the cover component 5 to support the connector 4 to be hung. The support component 7 integrally has an axial part 70 passing through the cover component 5, a head part at one end of the axial part 70, an attachment part for the connector 4 at the other end of the axial part 70, and a return part 71 elastically deformable in the state where the cover component 5 is interposed between the head part and the return part 71. Thus, the connector 4 is held under the cover component 5, and the cover component 5 works as an umbrella so that water does not directly fall on the connector 4 even if water falls on the cover component 5.

The external wall part 3132, the groove portion 53, the first cover wall part 52, and the cover component 5 are located in this order from the inner side to the outer side in the radial direction. The external wall part 3132 and the groove portion 53 are located on the opposite side of the connector 4 through the tabular portion of the cover component 5 in the axial direction.

Figure 7:
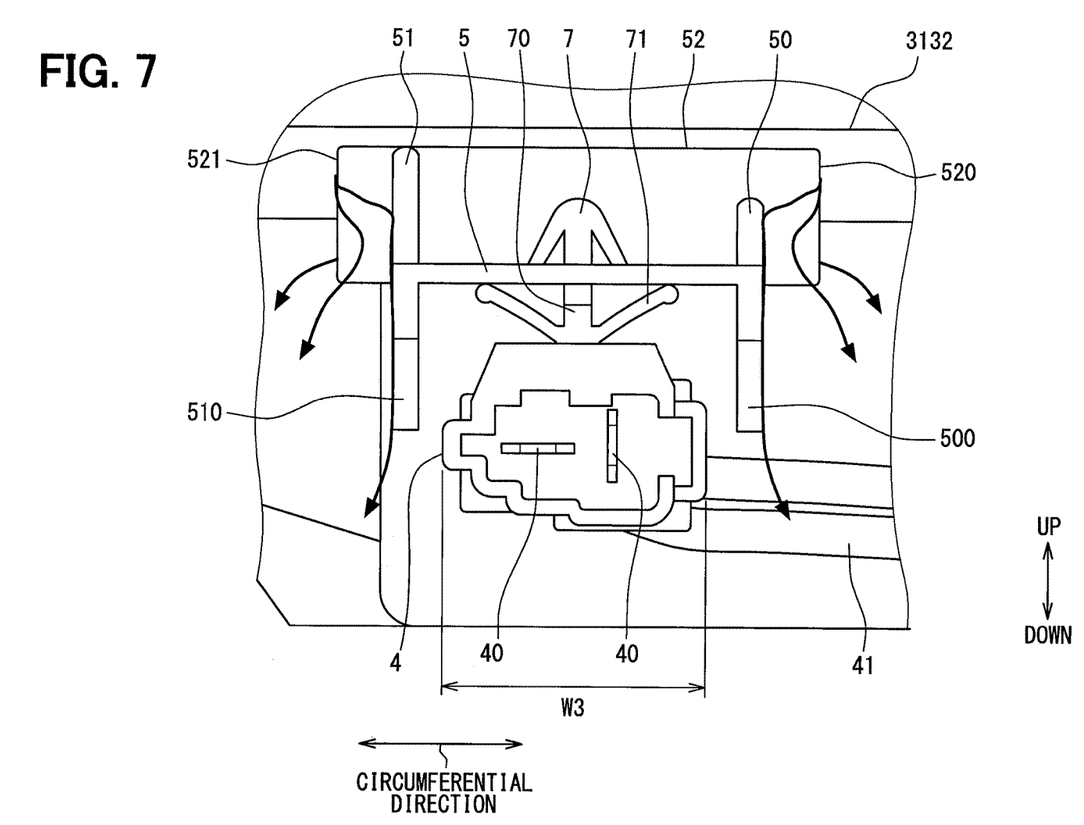
FIG. 7 is an enlarged elevation view illustrating the waterproofing structure in the ventilation unit of the first embodiment.

As shown in FIG. 6 and FIG. 7, the length of the groove portion 53 in the circumferential direction is longer than that of the connector 4. Therefore, the width dimension W3 that is a length of the connector 4 in the circumferential direction is set smaller than the width dimension W2 of the groove portion 53. Furthermore, the both ends of the groove portion 53 in the circumferential direction, i.e., one end 530 and the other end 531 are located outside of the both ends of the connector 4 in the circumferential direction, respectively.

The length of the first cover wall part 52 in the circumferential direction is longer than that of the groove portion 53, and is longer than that of the connector 4. Therefore, the width dimension W1 that is a length of the first cover wall part 52 in the circumferential direction is set larger than the width dimension W2 of the groove portion 53, and is set larger than the width dimension W3 of the connector 4. Furthermore, the both ends of the first cover wall part 52 in the circumferential direction, i.e., one end 520 and the other end 521 are located outside of the both ends, i.e., one end 530 and the other end 531 of the groove portion 53 in the circumferential direction, respectively.

The ventilation unit 3 has second cover wall parts 50, 51 projected outward from the surface of the first cover wall part 52. The second cover wall part 50, 51 are two wall parts integrally formed with the cover component 5 at both ends in the circumferential direction with an interval therebetween. The interval between the second cover wall part 50 and the second cover wall part 51 in the circumferential direction is longer than the length of the connector 4 in the circumferential direction.

The second cover wall part 50 and the second cover wall part 51 are formed to be located outside of the both ends of the connector 4 in the circumferential direction, respectively. That is, the connector 4 does not exist directly under each of the second cover wall part 50 and the second cover wall part 51. The connector 4 exists between the lower end 500 of the second cover wall part 50 and the lower end 510 of the second cover wall part 51.

As shown in FIG. 6 and FIG. 9, the lower end 500 of the second cover wall part 50 may desirably be located below the lower end of the first cover wall part 52. Similarly, the lower end 510 of the second cover wall part 51 may desirably be located below the lower end of the first cover wall part 52. According to this positional relationship, the water reaching the groove portion 53 or the first cover wall part 52 is easily guided to flow to each lower end 500, 510 of the second cover wall part 50, 51.

Furthermore preferably, the lower end 500 of the second cover wall part 50 is formed to be located downward as approaching the first cover wall part 52. Similarly, the lower end 510 of the second cover wall part 51 is formed to be located downward as approaching the first cover wall part 52. Due to this form, as shown in FIG. 9, the water reaching the second cover wall part 50 or the second cover wall part 51 is easily guided to flow to the proximal side near the first cover wall part 52, i.e., toward the root end located below the tip end.

Moreover, each upper end of the second cover wall part 50, 51 is formed to be located upward as approaching the first cover wall part 52. Especially each upper end of the second cover wall part 50, 51 forms an end surface which is declined downward as extending from the first cover wall part 52 to the tip end. With this form, the water reaching each upper end of the second cover wall part 50, 51 is easily guided to flow toward the tip end.

Figure 8:
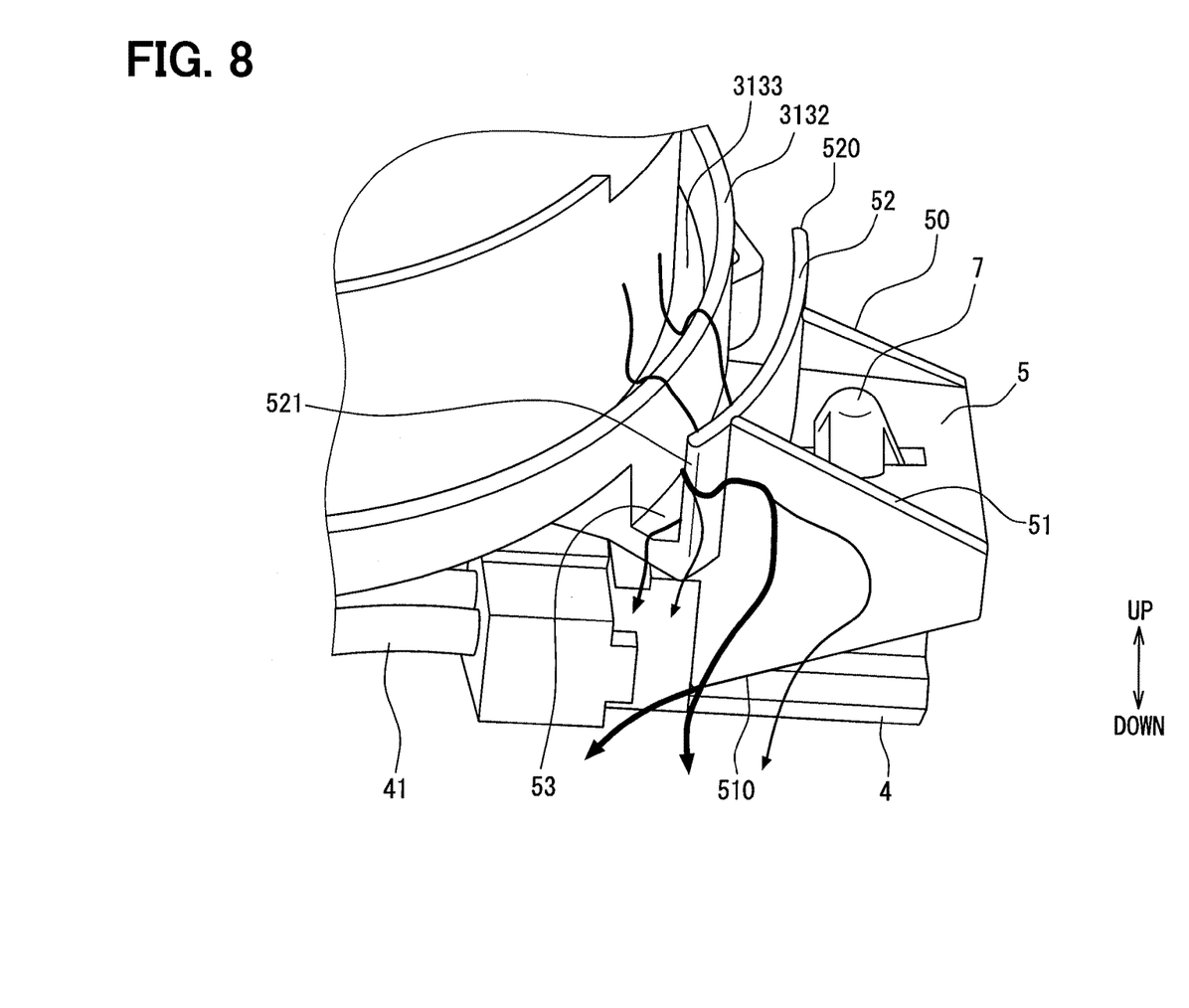
FIG. 8 is an enlarged perspective diagram illustrating the waterproofing structure in the ventilation unit of the first embodiment.

As shown in FIG. 8 and FIG. 9, each side surface of the second cover wall part 50, 51 presents a tapering shape such that the length in the up-and-down direction becomes shorter as going away from the first cover wall part 52. That is, the second cover wall part 50, 51, as a whole, has a taper shape where the upper end and the lower end are sloped so that the length in the up-and-down direction becomes longer from the distal end to the proximal end.

The interval between the external wall part 3132 and the first cover wall part 52, i.e., the distance between the external wall part 3132 and the first cover wall part 52 in the radial direction or the length of the groove portion 53 in the radial direction is set to a dimension in a manner that water leaked out of the casing 312 cannot move, due to surface tension, directly from the external wall part 3132 to the first cover wall part 52. That is, the dimension is set to a value such that a predetermined amount of water falls downward out of the ventilation unit 3 after flowing along the external wall part 3132 and the groove portion 53.

The effect and advantage of the ventilation unit 3 of this embodiment will be described. The ventilation unit 3 includes the motor support component 313 fixed to the lower surface of the casing 312 to support the motor 310, and the connector 4 installed below the casing 312 and having the connection terminal 40 in which electric current flows. The ventilation unit 3 has: the first cover wall part 52 which stands to extend in the up-and-down direction and the circumferential direction with an interval on the outer side of the external wall part 3132; the groove portion 53 which connects the first cover wall part 52 and the motor support component 313; and the cover component 5 which covers the upper side of the connector 4. The groove portion 53 has the bottom surface extending in the circumferential direction and located below the upper end of the external wall part 3132 and the upper end of the first cover wall part 52. The cover component 5 is integrally formed with the outer side of the first cover wall part 52. The groove portion 53 has the length longer than that of the connector in the circumferential direction. The both ends of the groove portion 53 in the circumferential direction are located outside of the both ends of the connector 4 in the circumferential direction, respectively.

The water in the air passage flows downward with gravity along the inner wall surface of the motor support component 313. It may be assumed that the water leaks outside through a fitting portion or the other crevices between the motor support component 313 and the casing 312. In contrast, according to the present disclosure, the waterproofing structure can be provided in which the leaked water does not reach the connector 4. The water leaked outside of the casing 312 flows along the external wall part 3132 of the motor support component 313, and flows into the groove portion 53 located below the upper end of the external wall part 3132. Namely, since the first cover wall part 52 stands to be spaced from the motor support component 313, the water flowing along the external wall part 3132 cannot directly move from the external wall part 3132 to the first cover wall part 52.

The water in the groove portion 53 falls downward via the both ends of the groove portion 53 or the first cover wall part 52 in the circumferential direction, since the water cannot move upward over the upper end of the first cover wall part 52 that is higher than the groove portion 53. That is, the water in the groove portion 53 flows horizontally to spread to the both ends of the groove portion 53 in the circumferential direction, and falls due to gravity from a position lower than the upper end of the first cover wall part 52. The water which fell in this way does not fall on the connector 4, since the both ends of the groove portion 53 and the first cover wall part 52 in the circumferential direction are located outside of the both ends of the connector 4 in the circumferential direction, respectively. In addition, since the cable 41 is wired to extend from the connector 4 towards the central part of the casing 312, the water does not fall on the cable 41. The above-described water drainage course is clearly shown by the arrows in FIG. 6-FIG. 9.

As mentioned above, the water leaked out of the casing 312 moves in the course not in contact with the connector 4, such that the connection terminal 40 inside the connector 4 can be prevented from being wet by the leaked water. Therefore, a fault caused by a short circuit between the connection terminals 40 can be suppressed in the ventilation unit 3.

Moreover, the length of the first cover wall part 52 in the circumferential direction is longer than that of the groove portion 53. The both ends of the first cover wall part 52 in the circumferential direction are located on the outer side of the both ends of the groove portion 53 in the circumferential direction, respectively.

Accordingly, the water in the groove portion 53, for example as shown in FIG. 6, comes to hit on the inner surface of the first cover wall part 52 and flows in the circumferential direction along the first cover wall part 52. Therefore, water flows as a vector spreading horizontally further than the both ends of the groove portion 53 in the circumferential direction, such that the water can be made to fall further away from the connector 4. Thus, the drainage course can be formed such that it is difficult for water to flow toward the cover component 5 under which the connector 4 is arranged.

The ventilation unit 3 further includes the second cover wall part 50, 51 integrally formed at each of the ends of the cover component 5 in the circumferential direction. The second cover wall part 50, 51 is projected outward from the surface of the first cover wall part 52. The second cover wall part 50, 51 is located on the outer side of each end of the connector 4 in the circumferential direction.

Accordingly, the water in the groove portion 53, for example as shown in FIG. 7-FIG. 9, comes to flow downward along the wall surface of each second cover wall part 50, 51. Therefore, water is guided downward by the second cover wall part 50, 51, and falls from each lower end 500, 510 of the second cover wall part 50, 51. Thus, the water falling from the lower end 500, 510 can be dropped under the ventilation unit 3 without contacting the connector 4.

The lower end 500, 510 of the second cover wall part 50, 51 is located below the lower end of the first cover wall part 52. Since the lower end 500, 510 is located below the lower end of the first cover wall part 52, the water flowing along the second cover wall part 50, 51 can be made to fall from the lower part away from the connector 4.

The second cover wall part 50, 51 has the shape in which the lower end 500, 510 is located lower as approaching the first cover wall part 52. Since the root side of the lower end 500, 510 adjacent to the first cover wall part 52 is located lower, the drainage of water can be facilitated along the lower end 500, 510 towards the root end. Thus, since the second cover wall part 50, 51 produces an effect of collecting the drain water, it is easy to form the mainstream of drainage and to raise the drainage speed. Therefore, prompt drainage can be carried out.

The second cover wall part 50, 51 is formed in a manner that the upper end is located upward as approaching the first cover wall part 52. In case where water flows along the upper end surface, the drainage of water flowing along the second cover wall part 50, 51 can be promoted away from the first cover wall part 52. For example, when the connector 4 is installed at the central part of the casing 312, the drainage of water can be promoted to flow away from the connector 4, such that the waterproofness of the connector 4 can be improved.

The air-conditioner 1 integrally includes the ventilation unit 3 and the air-conditioning unit 2 having air-conditioning components which condition air sent by the ventilation unit 3. The ventilation unit 3 takes in outside air from outside of the passenger compartment of the vehicle, and the air conditioned in the air-conditioning unit 2 is provided to the passenger compartment.

Accordingly, the water leaked outside of the casing 312 follows the course not in contact with the connector 4 finally, such that the connection terminal 40 inside the connector 4 can be prevented from being wet by the leaked water. Therefore, in a case where the air-conditioner 1 is used in severe environments such as snowfall or rain, a fault caused by a short circuit between the connection terminals 40 can be effectively controlled without increase in cost, for example, caused by a waterproofing structure for a connector.

(Second Embodiment)

A ventilation unit of a second embodiment is described with reference to FIG. 10 as a modification of the first embodiment. A first cover wall part 152 of the ventilation unit of the second embodiment is different from that of the ventilation unit 3 of the first embodiment. Portions not explained in the second embodiment are the same as those in the first embodiment, and points different from the first embodiment are explained.

Figure 10:
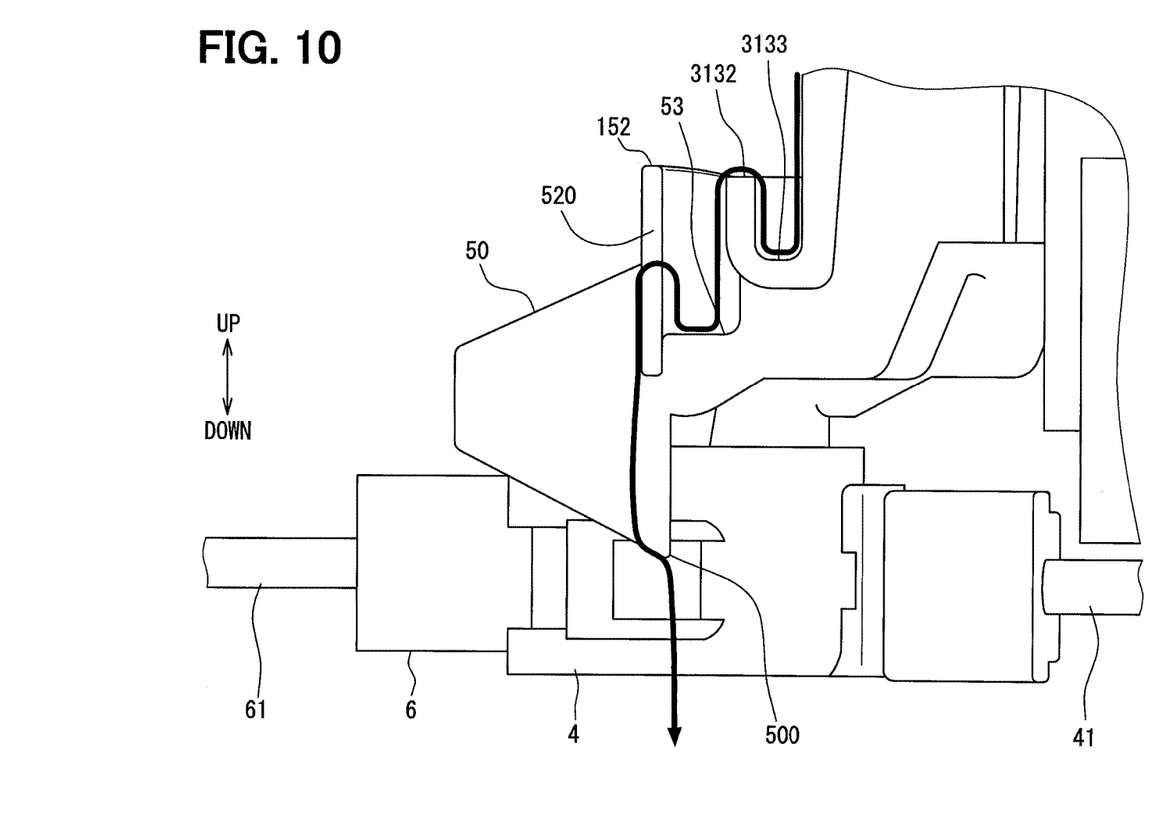
FIG. 10 is an enlarged side view illustrating a waterproofing structure in a ventilation unit according to a second embodiment.

As shown in FIG. 10, the first cover wall part 152 is formed so that the upper end of the first cover wall part 152 is located at a position higher than the upper end of the external wall part 3132. Namely, water leaked out of the casing 312 along the external wall part 3132 cannot reach the upper surface of the cover component 5 over the first cover wall part 152 before reaching a height exceeding the upper end of the first cover wall part 152.

According to the second embodiment, as shown in FIG. 10, it is difficult for the water in the groove portion 53 to move to the upper surface of the cover component 5 by flowing over the upper end of the first cover wall part 152. Therefore, water can be more restricted from falling on the upper surface of the cover component 5, thereby reducing a risk where the water contacts the connector 4, and can be made to fall further away from the connector 4.

(Other Embodiment)

Hereinbefore, the preferred embodiments have been described. However, the disclosure is not limited to the embodiments described above and can be realized in various modifications. The structures of the above embodiments are merely exemplary, and technical scopes of the present disclosure are not limited to the disclosed scopes. The technical scope of the present disclosure is represented by the claims, and includes meanings equivalent to those of the claims, and all changes in the scope.

In the above-mentioned embodiment, as an example, water leaks outside from a fitting portion between the motor support component 313 which supports the motor and the casing 312 which forms the air passage. The course of water drainage explained in the above-mentioned embodiment is only an example, and is not limited to the example. The water in the air passage may be drained outside through various parts such as the other fitting portion, crevice, and hole.

In the above embodiment, the motor support component 313 is fixed in the state where the motor support component 313 is inserted in the opening formed in the lower surface of the casing 312. The structure for fixing the motor support component 313 to the casing 312 is not limited to this form. For example, in the above-mentioned embodiment, the tip end of the external wall part 3132 constitutes the upper surface. Alternatively, the motor support component 313 may be fixed to the casing 312 in the state where the tip end of the external wall part 3132 constitutes the lower surface.

Although the fan 311 of the blower device is a centrifugal fan in the above-mentioned embodiment, the blower device of the present disclosure is not limited to such a fan.

In the above embodiment, the components made of resin such as the fan 311, the casing 312, and the motor support component 313 may be molded with resin material containing talc and glass fiber of a predetermined quantity, in order to improve the strength at each part.

What is claimed is:

1. A blower device comprising:
   a casing having an air passage in which air flows;
   a fan disposed in the casing;
   a motor that provides a driving force to rotate the fan;
   a motor support component fixed to a lower surface of the casing to support the motor, the motor support component having
      an external wall part in contact with the casing around a perimeter part of the casing,
      an inner wall surface communicated to the air passage, and
      an outer wall surface exposed outside;
   a first cover wall part formed integrally with the motor support component, the first cover wall part extending in an axial direction and a circumferential direction to be spaced from the external wall part on an outer side;
   a groove portion that connects the first cover wall part and the motor support component with each other, the groove portion having a bottom surface extending in the circumferential direction and located below an upper end of the external wall part and an upper end of the first cover wall part;
   a connector including a connection terminal in which electric current flows, the connector being disposed below the casing or the motor support component; and
   a cover component integrally formed with an outer side of the first cover wall part to cover an upper side of the connector, wherein
   the groove portion has a length longer than that of the connector in the circumferential direction, and
   the groove portion has ends in the circumferential direction, the ends of the groove portion are unobstructed and located outside of ends of the connector in the circumferential direction, respectively.

2. The blower device according to claim 1, wherein
   the first cover wall part has a length longer than that of the groove portion in the circumferential direction, and
   the first cover wall part has ends in the circumferential direction, and the ends of the first cover wall part are located outside of the ends of the groove portion in the circumferential direction, respectively.

3. The blower device according to claim 1, further comprising:
   a second cover wall part projected outward from a surface of the first cover wall part, the second cover wall part being formed integrally with each end of the cover component in the circumferential direction, wherein
   the second cover wall part is located outside of each of the ends of the connector in the circumferential direction.

4. The blower device according to claim 3, wherein
   the second cover wall part has a lower end located below a lower end of the first cover wall part.

5. The blower device according to claim 4, wherein
   the lower end of the second cover wall part is formed to slope downward approaching the first cover wall part.

6. The blower device according to claim 4, wherein
   an upper end of the second cover wall part is formed to slope upward approaching the first cover wall part.

7. The blower device according to claim 1, wherein
   the first cover wall part has an upper end located at a position higher than an upper end of the external wall part.

8. The blower device according to claim 1, wherein
   the external wall part, the groove portion, the first cover wall part and the cover component are arranged in this order from an inner side to an outer side in a radial direction, and
   the external wall part and the groove portion are located opposite from the connector through a tabular portion of the cover component in the axial direction.

9. The blower device according to claim 1, wherein
   the groove portion defines a drainage path configured to prevent the connector from getting wet.

10. An air conditioner for a vehicle integrally comprising:
    the device according to claim 1; and
    an air-conditioning unit having an air-conditioning function component which conditions air sent by the blower device, wherein
    the blower device draws outside air outside of a passenger compartment of the vehicle, and provides air conditioned by the air-conditioning unit into the passenger compartment.

* * * * *